US005808773A

United States Patent [19]

Ono

[11] Patent Number: 5,808,773

[45] Date of Patent: *Sep. 15, 1998

[54] SCANNING OPTICAL SYSTEM

[75] Inventor: Satoru Ono, Toyokawa, Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 606,654

[22] Filed: Feb. 26, 1996

[30] Foreign Application Priority Data

Mar. 2, 1995 [JP] Japan .................................... 7-042748

[51] Int. Cl.[6] .................................................... G02B 26/08

[52] U.S. Cl. .......................... 359/205; 359/206; 359/207; 359/662

[58] Field of Search .................................... 359/205–207, 359/711, 717, 795, 662, 212–219

[56] References Cited

U.S. PATENT DOCUMENTS

| | | | |
|---|---|---|---|
| 3,973,833 | 8/1976 | Lawson | 359/795 |
| 5,086,350 | 2/1992 | Nishihata | 359/206 |
| 5,128,795 | 7/1992 | Endou et al. | 359/207 |
| 5,179,465 | 1/1993 | Kondo . | |
| 5,206,755 | 4/1993 | Yamakawa | 359/206 |
| 5,343,325 | 8/1994 | Yamakawa | 359/205 |
| 5,715,079 | 2/1998 | Ono | 359/205 |

FOREIGN PATENT DOCUMENTS

| | | |
|---|---|---|
| 61-170715 | 8/1986 | Japan . |
| 4110817 | 5/1992 | Japan . |
| 4153616 | 5/1992 | Japan . |

*Primary Examiner*—James Phan
*Attorney, Agent, or Firm*—Price, Gess & Ubell

[57] ABSTRACT

A scanning optical system is provided with a scanning lens which images a luminous flux deflected by a deflector at a constant angular speed on a surface to be scanned so that the luminous flux scans the surface to be scanned substantially at a constant speed. At the cross section in the main scanning direction, the luminous flux incident on the scanning lens is a convergent light beam, and the scanning lens includes from the deflector side a first lens of a positive paraxial refractive power and a second lens of a negative paraxial refractive power.

36 Claims, 20 Drawing Sheets

SCANNING OPTICAL SYSTEM

BACKGROUND OF THE INVENTION

1. Field of the Invention

The present invention relates to a scanning optical system, and more specifically, to a scanning optical system for use in electrophotographic printers.

2. Description of the Prior Art

As a conventional laser scanning optical system, an optical system is known in which after a divergent beam emitted from a laser source is converted into a parallel beam by a collimator lens, the beam is deflected by a deflector such as a polygonal mirror at a constant angular speed and is imaged into a laser spot on a surface to be scanned (hereinafter, referred to as "scanned surface") by a scanning lens system so as to scan the scanned surface substantially at a constant speed. It is necessary for the scanning lens used in the scanning optical system to have the following three properties:

A first property is an fθ property. The fθ property is a negative distortion property such that an angle of view θ of a luminous flux having exited from the deflector is proportional to an image height y' at a cross section in the main scanning direction, for example, a property such that y'=fθ when a luminous flux incident on the scanning lens at an angle of view θ is a parallel light beam. Here, f is the focal length of the scanning lens and y' is the image height of the parallel light beam imaged on the image plane. The angle of view θ is an angle of deflection, i.e. an angle between the luminous flux deflected by the deflector and the optical axis of the scanning lens.

A second property is an image plane property. The image plane property is a property that a luminous flux deflected by the deflector so as to scan the scanned surface at a constant speed is imaged (i.e. converged) on the scanned surface. Therefore, the image plane property is expressed by the field curvature representative of how far the position of convergence of the luminous flux in the vicinity of the principal ray is positioned away from the scanned surface at each angle of view and image height. Since it is necessary for the luminous flux incident on the deflector to be imaged on the scanned surface by the condensing action of the scanning lens with respect to both a direction parallel to the axis of rotation of the deflector (i.e. the main scanning direction) and a direction vertical thereto (i.e. the sub scanning direction), the image plane property is required with respect to both the main and sub scanning directions.

A third property is coma. Even if the above-described fθ property and image plane property are excellent, the luminous flux cannot be sufficiently converged on the scanned surface unless this property is satisfied. While field curvature is a property only with respect to the position of convergence of the luminous flux in the vicinity of the principal ray, coma is a property representative of how far the light beam of the entire area of the luminous flux is away from the position of the principal ray on the image plane.

The necessary amounts of the above-described three properties depend on the performance, function and cost demanded by the laser printer. For example, U.S. Pat. No. 5,179,465 and Japanese Laid-open Patent Applications Nos. H4-153616 and H4-110817 disclose two-lens scanning lenses which realize small-size and high-definition scanning optical systems and the amounts of the above three properties must be such that the size reduction does not impair the high definition.

Moreover, as well known, reducing the distance from the deflector to the image plane by deflecting a parallel light beam incident on the deflector at a great maximum angle of deflection to image it by a scanning lens having a short focal length is effective in reducing the size of the scanning optical system. The scanning optical systems disclosed by the above-mentioned prior art patent and patent applications employ this method and their maximum angles of deflection are 40° or greater.

Japanese Laid-open Patent Application No. S61-170715 discloses a scanning lens consisting of from the deflector side a positive lens element and a negative lens element. The negative lens element is disposed in the vicinity of the image plane in order to reduce the magnification in the sub scanning direction. The parallel light beam deflected by the deflector is imaged on the scanned surface. The parallel light beam scans the scanned surface in the main scanning direction substantially at a constant speed. For this scanning lens, the three properties must not be impaired by the reduction in the sub scanning direction magnification.

In order to realize a high-definition optical system as disclosed by U.S. Pat. No. 5,179,465 and Japanese Laid-open Patent Applications Nos. H4-153616 and H4-110817, the beam diameter must be small on the scanned surface. In order to reduce the beam diameter, it is necessary to increase the scanning speed on the scanned surface. This is because the print output speed is low unless the scanning speed is high. To increase the scanning speed, for example, the speed of rotation of the deflector is increased or the number of deflective reflection surfaces of the deflector is increased.

The increase in the speed of rotation increases the motor size and the cost. The increase in the number of deflective reflection surfaces increases the size of the deflector for the following reason: When the maximum angle of deflection is great and the focal length of the scanning lens is small, the reduction in the beam diameter on the scanned surface increases the beam diameter in the main scanning direction on the deflective reflection surface. For this reason, the effective area on the deflective reflection surface must be large. However, if the effective area is increased without the size of the deflector being increased, the number of deflective reflection surfaces decreases. Thus, the number of deflective reflection surfaces cannot be increased.

Thus, according to the scanning lenses as disclosed by the above-mentioned prior art patent and patent applications, even if a small-size and high-definition scanning optical system were realized, it would be necessary to set the output speed of the printer to be low or to provide a deflector having a high rotation speed or a large size in order to actually incorporate this lens in a printer. Then, there would be little merit in the size reduction of the scanning optical system and such optical system would be disadvantageous in cost.

According to a scanning lens disclosed by Japanese Laid-open Patent Application No. S61-170715, it is impossible to reduce the size of the scanning optical system. This is because a negative lens element disposed in the vicinity of the image plane in order to reduce the magnification in the sub scanning direction is a large-length and large-size lens which is very difficult to mold and if this lens is incorporated in the print head, the size of the print head unit will be very large, and because the luminous flux incident on the deflector is a parallel light beam and even if the parallel light beam is deflected at a great maximum angle of deflection, the distance from the deflector to the scanned surface is never reduced due to the effect of the scanning lens.

SUMMARY OF THE INVENTION

An object of the present invention is to provide a small-size and high-definition scanning optical system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
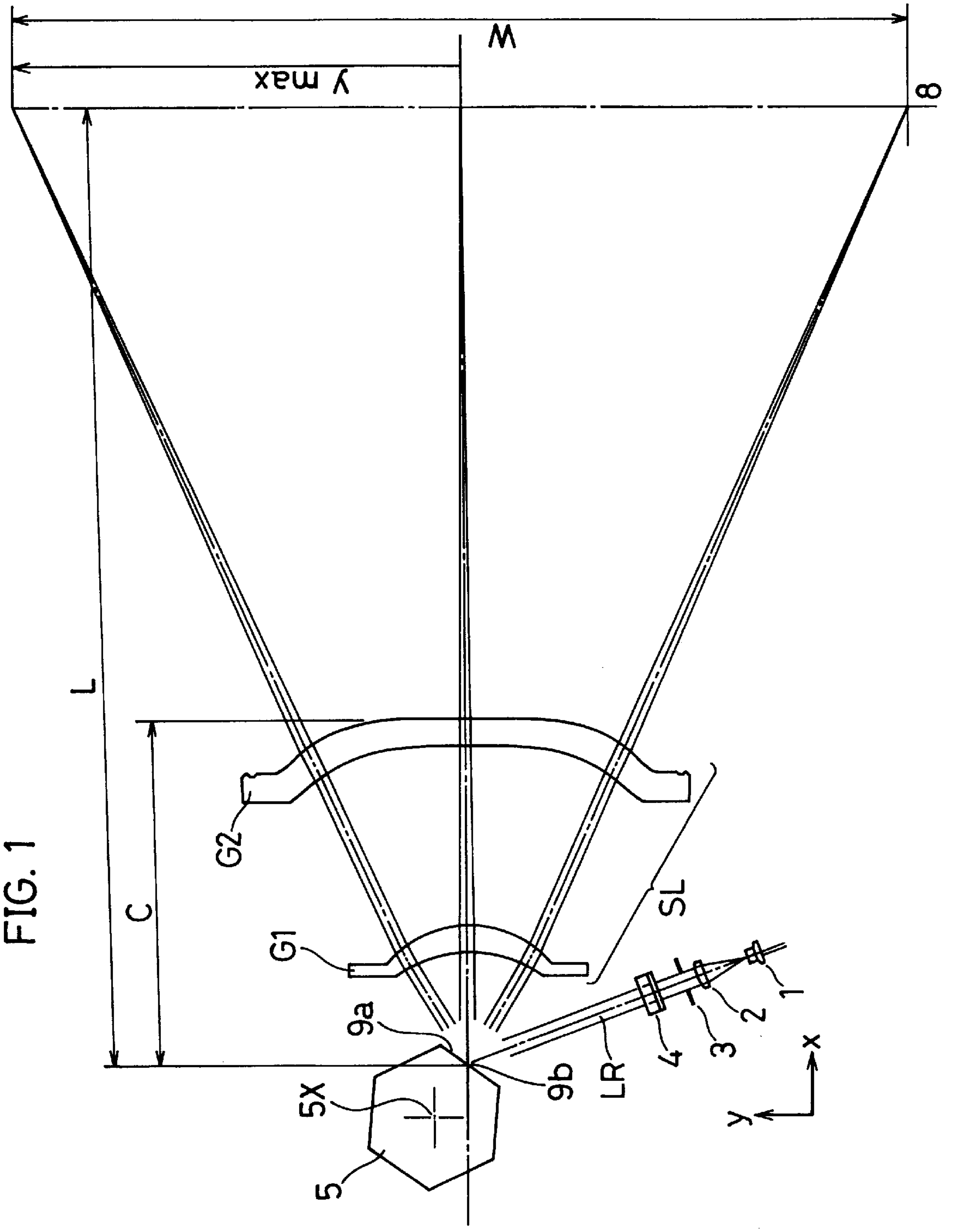
FIG. 1 is a main scanning direction cross-sectional view of a scanning optical system embodying the present invention.

A scanning optical system according to the present invention is provided with a deflector and a scanning lens which images on the scanned surface a luminous flux deflected by the deflector at a constant angular speed and causes the luminous flux to scan the scanned surface in the main scanning direction substantially at a constant speed. At the cross section in the main scanning direction, the luminous flux incident on the scanning lens is a convergent light beam, and the scanning lens includes from the deflector side a lens element of a positive paraxial refractive power and a lens element of a negative paraxial refractive power.

The aforementioned features that the scanning lens includes from the deflector side a lens element of a positive paraxial refractive power and a lens element of a negative paraxial refractive power and that the luminous flux incident on the deflector is a convergent light beam to enable a large reduction in the distance from the deflector to the image plane without the maximum angle of deflection being increased and the focal length of the scanning lens being reduced. The distance from the deflector to the image plane may be reduced even if the luminous flux incident on the scanning lens is a weak convergent light beam. Thus, the feature that a convergent light beam is incident on the scanning lens increases the number of design parameters of the scanning optical system by one and is effective in providing the design with a degree of freedom.

In addition, according to the present invention, the main scanning direction optical properties (i.e. the three properties described above) are satisfied while the scanning lens includes a positive lens element and a negative lens element and the light beam incident on the scanning lens at the cross section in the main scanning direction is a convergent light beam. Further, it is preferred that the positive lens element is a rotationally symmetrical lens and that at least one surface of the negative lens element is an extended toric surface. Then, sub scanning direction optical properties will be satisfied as well as the main scanning direction optical properties.

It is preferred that the scanning lens is made of a resin. Since resin-made lenses may be processed by injection molding, the use of resin lenses as the positive and negative lens elements is advantageous in mass production and cost. The scanning optical system according to the present invention satisfies the above-described optical properties even if the refractive indices of the positive and negative lens elements are 1.6 or lower.

It is preferred that the positive lens element has at least one spherical surface which is advantageous because of the easiness of mold processing and inspections after molding, and has its both side surfaces formed to be rotationally symmetrical. Additionally, it is advantageous over bi-convex and bi-concave lens elements in view of moldability that both the positive and negative lens elements have their main scanning direction paraxial cross sections formed to be of meniscus configurations concave to the deflector side.

Subsequently, preferred conditions with respect to the configuration and refractive power of the scanning lens will be described. It is preferred that the scanning lens fulfills the following condition (1):

$$0<\beta<0.4 \quad (1)$$

where β is the magnification of the scanning lens in the main scanning direction.

The condition (1) shows the incidence of the convergent light beam on the deflective reflection surface of the deflector and a range in which a jitter caused by variation in the distance from the axis of rotation of the deflector (e.g. polygonal mirror) and the deflective reflection surface (hereinafter, this distance will be referred to as "axis-to-surface distance") does not affect the image quality. When the main scanning direction magnification β is 0, a parallel light beam is incident and the degree of freedom of the design is reduced, so that the size of the apparatus and the configuration of the lens are limited. On the other hand, when the main scanning direction magnification β exceeds the upper limit of the condition (1), the degree of convergence of the incident luminous flux increases.

When the luminous flux incident on the deflector is a convergent light beam, since this feature enables the focal length of the scanning lens to be in the vicinity of infinity (∞) and enables the main scanning direction magnification β to be in the vicinity of 1, the image shift of the resin-made scanning lens caused by variation in environmental temperature is effectively prevented. However, when the main scanning direction magnification β exceeds the upper limit of the condition (1) to be in the vicinity of 1, the variation in the axis-to-surface distance brings about the generation of the jitter. In order to prevent the generation of the jitter, extra care must be taken on the assembly adjustment and processing accuracy of the deflector.

At the cross section in the main scanning direction, since the positive lens element is a lens element of a positive paraxial refractive power and the negative lens element is a lens element of a negative paraxial refractive power, the following condition (2) holds:

$$f_1>0 \text{ and } f_2<0 \quad (2)$$

where $f_1$ is the paraxial focal length of the positive lens element disposed on the deflector side at the cross section in the main scanning direction, and $f_2$ is the paraxial focal length of the negative lens element disposed on the image side at the cross section in the main scanning direction.

The condition (2) shows a preferred refractive power range of the scanning lens to prevent the increase in the size of the scanning lens and in the distance from the deflector to the image plane without the maximum angle of deflection being increased. When $f_1$ and $f_2$ are outside the ranges of the condition (2), the distance from the deflector to the image plane increases or the main scanning direction magnification β exceeds the upper limit of the condition (1) unless the maximum angle of deflection is large.

It is preferred that the scanning lens fulfills the following condition (3) within the range of the condition (2):

$$-0.7<\frac{f_1}{f_2}<-0.3 \quad (3)$$

When the upper limit of the condition (3) is exceeded, the distance from the deflector to the image plane increases. When the lower limit of the condition (3) is exceeded, the main scanning direction magnification β exceeds the upper limit of the condition (1).

Additionally, it is preferred that the following condition (4) is fulfilled:

$$0.25<\frac{C}{L}<0.5 \quad (4)$$

where L is the distance from the point of deflection to the image plane, and C is the distance from the point of deflection to the image side surface of the negative lens element disposed on the image side. The distances L and C of embodiments described later are shown in FIG. 1

The condition (4) shows a preferred range of the ratio between the size of the scanning lens and the size of a portion occupied by the elements constituting the scanning optical system. When the upper limit of the condition (4) is exceeded, the length of the scanning lens increases and the portion occupied by the elements increases. This is disadvantageous in the molding accuracy of the lens and in the cost of the apparatus. When the lower limit of the condition (4) is exceeded, the correction of coma of the scanning lens becomes difficult and the sensitivity to errors becomes extremely high.

Additionally, it is preferred that the following condition (5) is fulfilled:

$$0.8<\frac{W}{L}<1.2 \quad (5)$$

where W is the scanning width on the image plane.

The condition (5) shows a preferred range of the distance from the deflector to the image plane. When the upper limit of the condition (5) is exceeded, the size of the apparatus increases. When the lower limit of the condition (5) is exceeded, the fθ property cannot be satisfied unless the maximum angle of deflection is increased.

Since the scanning lens includes from the deflector side a lens element of a positive paraxial refractive power and a lens element of a negative paraxial refractive power, the distance from the deflector to the image plane and the size of the scanning lens may be reduced while the optical properties are maintained high without the maximum angle of deflection being increased. Since the luminous flux incident on the scanning lens is a convergent light beam, the distance from the deflector to the image plane and the size of the scanning lens may be reduced while the optical properties are maintained high without the focal length of the scanning lens being reduced. Since it is unnecessary to increase the maximum angle of deflection and to reduce the focal length of the scanning lens, it is unnecessary to increase the effective area on the deflective reflection surface. Consequently, the scanning speed on the scanned surface may be increased even if the size of the deflector is decreased. As a result, the beam diameter on the scanned surface is reduced.

Numerical data of first to sixth embodiments of the present invention are shown in Tables 1 to 6, respectively. In each table, r0 is the radius of curvature (=∞) of the deflective surface of the deflector, ri (i=1,2,3,4) is the radius of curvature of the ith surface counted from the deflector side, riM (i=3,4) is the radius of curvature, in the main scanning direction, of the ith surface counted from the deflector side, riS (i=3,4) is the radius of curvature, in the sub scanning direction, of the ith surface counted from the deflector side, d0 is the axial distance from the point of deflection on the deflective surface of the deflection to the first lens surface, di (i=1,2,3) is the axial distance between the ith surface and the i+1th surface counted from the deflector side, LB is the back focal length (axial distance between the image side surface of the most image side lens and the scanned surface (image plane)), and Ni (i=1,2) is the refractive index of the ith lens counted from the deflector side, to a light beam with a wave-length of 780 nm.

The fourth surfaces (r4M, r4S) of the first to fifth embodiments and the third surface (r3M, r3S) of the sixth embodiment are extended toric surfaces. Hereinafter, the extended toric surface will be described. This surface is a toric surface such that the cross section in the main scanning direction is aspherical and the curvature in the sub scanning direction continuously varies along the cross section in the main scanning direction. This surface is defined as a function of y and z by the following expression (A):

$$x = \kappa \cdot \frac{y^2}{1 + (1 - \mu \cdot \kappa^2 \cdot y^2)^{\frac{1}{2}}} + \rho + A \quad \text{(A)}$$

Here, $$\kappa = \frac{K}{1 - K \cdot \rho} \quad \text{(B)}$$

$$\rho = c \cdot \frac{z^2}{1 + (1 - \epsilon \cdot c^2 \cdot z^2)^{\frac{1}{2}}} \quad \text{(C)}$$

That is, the extended toric surface is obtained as a reference z toric surface to which a two-dimensional additive term A(y,z) is added. Here, when a main curve is a curve at the cross section in the main scanning direction and a profile curve is a curve at the cross section in the sub scanning direction (i.e. x direction is the direction along the optical axis, y direction is the main scanning direction, and z direction is the sub scanning direction), K and c are curvatures at the vertices along the main and profile curves (exactly, $K+2a_{0,2}$ and $c+2a_{2,0}$, respectively) (i.e. 1/K is the radius of curvature at the vertex along the main curve and 1/c is the radius of curvature (radius of curvature in the sub scanning direction at the vertex of the main curve) along the profile curve), and $\mu$ and $\epsilon$ are conic constants (hyperbola when negative, parabola when zero, ellipse when positive, circle when 1) along the main and profile curves, respectively.

For example, when p=1 and A=0, the expression (A) represents a conventional toric surface (secondary profile curve ρ rotated with a radius of 1/K about an axis parallel to the Z axis). A of the expression (A) is expressed by the following expression:

$$A = \sum_{i=0}^{16} \left[ \sum_{j=0}^{8} a_{i,j} \cdot |y|^2 \right] \cdot |z|^2$$

where $a_{0,0} \equiv 0$, $a_{i,1} \equiv 0$, and $a_{1,j} \equiv 0$.

In each table, the surfaces marked with asterisks are rotationally symmetrical aspherical surfaces and defined by the following expression representing the surface configuration of an aspherical surface:

$$X = \frac{C \cdot Y^2}{1 + (1 - \epsilon \cdot Y^2 \cdot C^2)^{\frac{1}{2}}} + \sum_i AiY^i$$

where X is a displacement amount along the optical axis from a reference surface, Y is a height in a direction vertical to the optical axis, C is a paraxial curvature, $\epsilon$ is a conic constant, and Ai is an ith aspherical coefficient (i=4,6,8,10).

Table 7 shows values corresponding the conditions (1) to (5) and other data in the embodiments. In this table, $\theta_{max}$ is an angle of view at a maximum angle between the deflected luminous flux and the optical axis of the scanning lens (i.e. the maximum angle of deflection), $Y_{max}$ is an image height which is the largest on the scanned surface, S1 is the distance from the deflective surface to the point of natural convergence (point at which the convergent light beam is converged when no scanning lens is provided, i.e. object point) of the convergent light beam.

Figure 2:
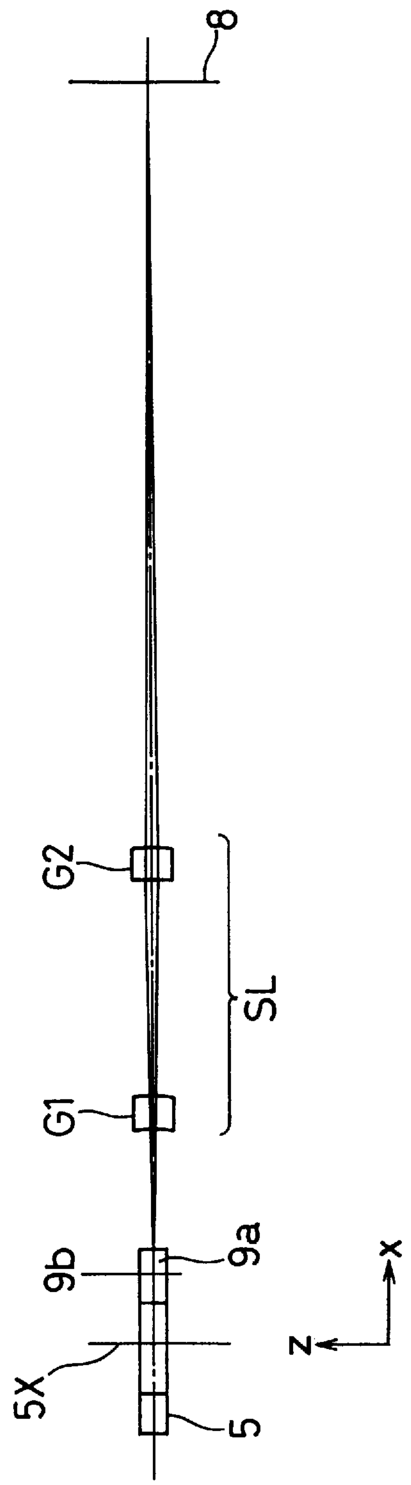
FIG. 2 is a sub scanning direction cross-sectional view of the scanning optical system embodying the present invention.
Figure 3:
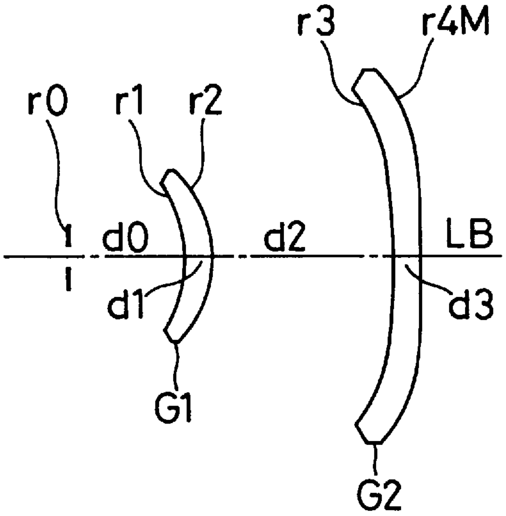
FIG. 3 is a main scanning direction cross-sectional view showing the lens arrangement of a first embodiment of the present invention.
Figure 4A:
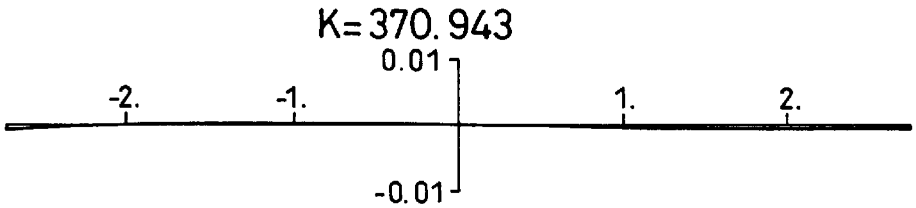
FIGS. 4A to 4E are graphic representations of lateral aberration of the first embodiment.
Figure 4B:
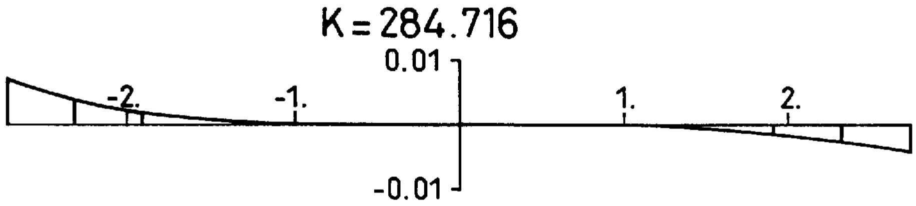
Figure 4C:
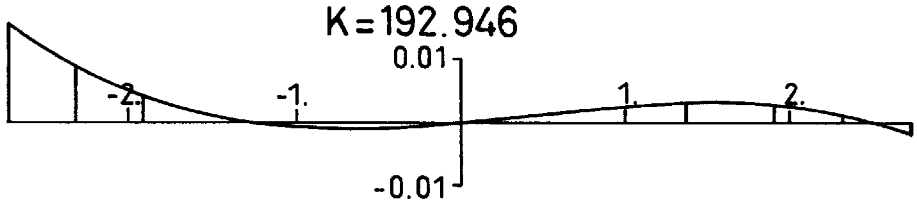
Figure 4D:
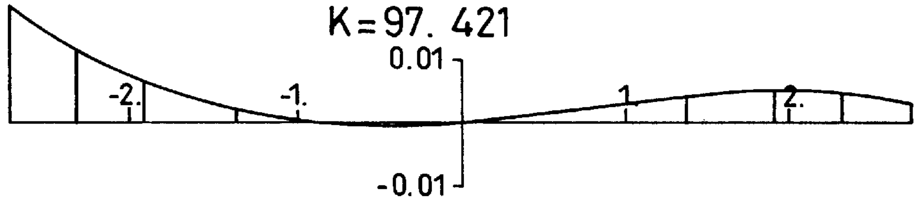
Figure 4E:
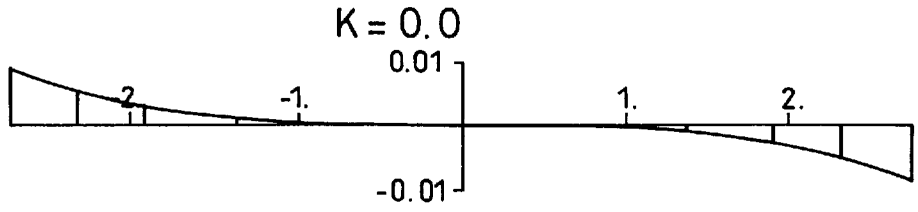
Figure 5:
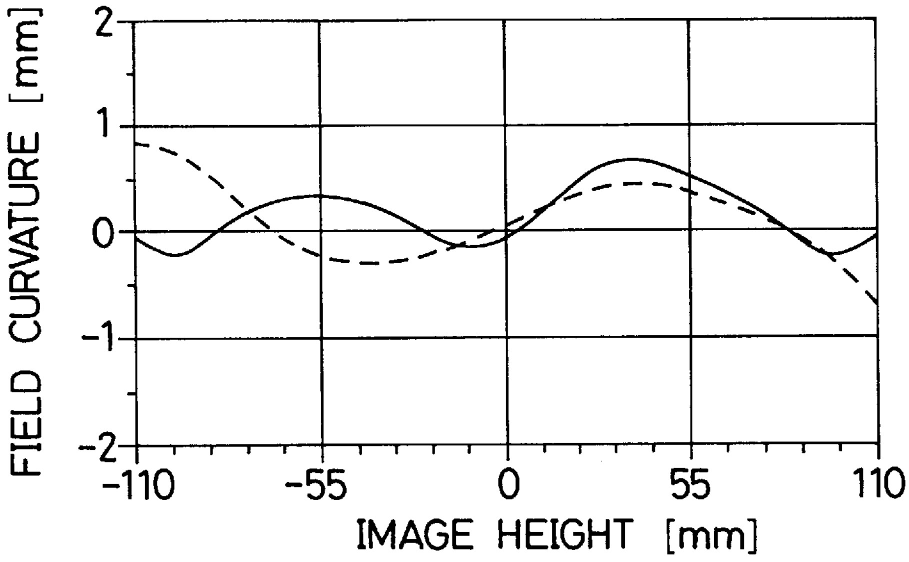
FIG. 5 is a graphic representation of field curvature of the first embodiment.
Figure 6:
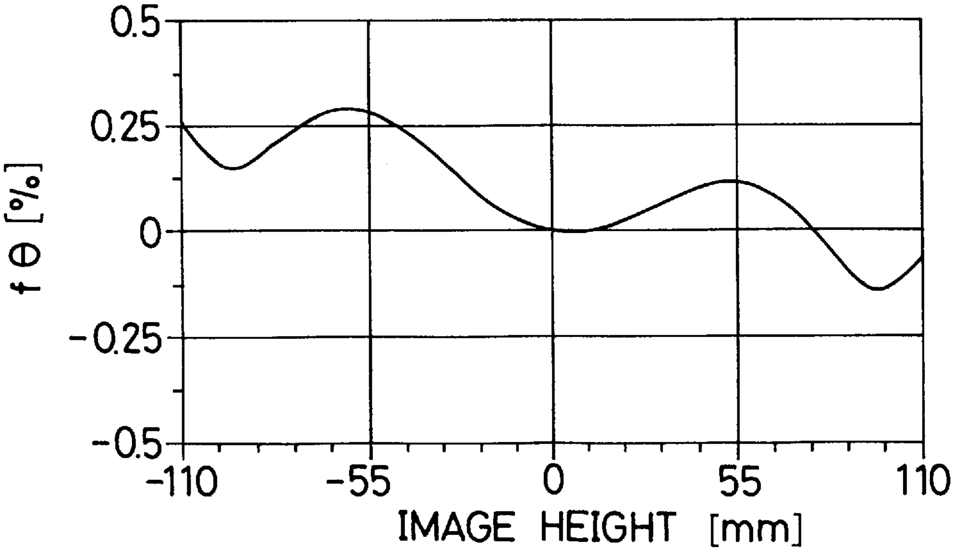
FIG. 6 is a graphic representation of the fθ property of the first embodiment.
Figure 7:
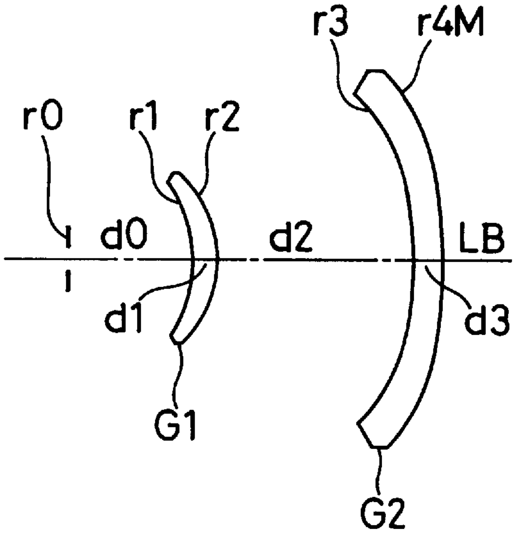
FIG. 7 is a main scanning direction cross-sectional view showing the lens arrangement of a second embodiment of the present invention.
Figure 8A:
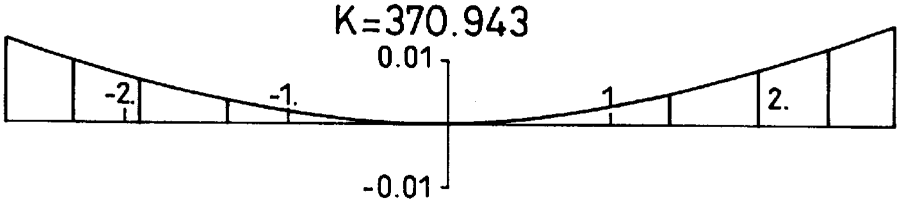
FIGS. 8A to 8E are graphic representations of lateral aberration of the second embodiment.
Figure 8B:
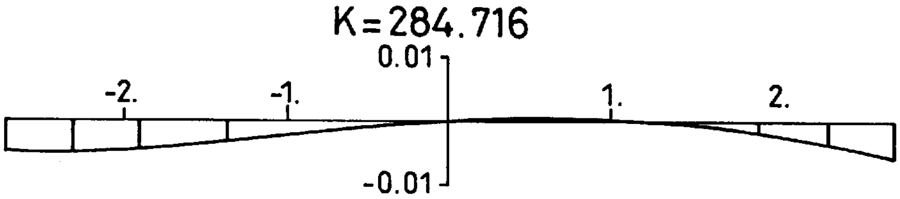
Figure 8C:
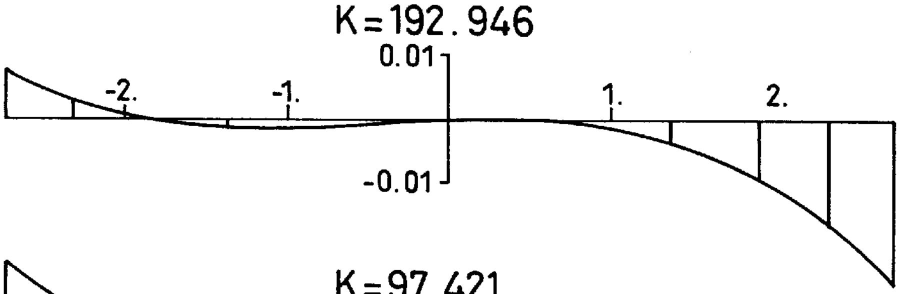
Figure 8D:
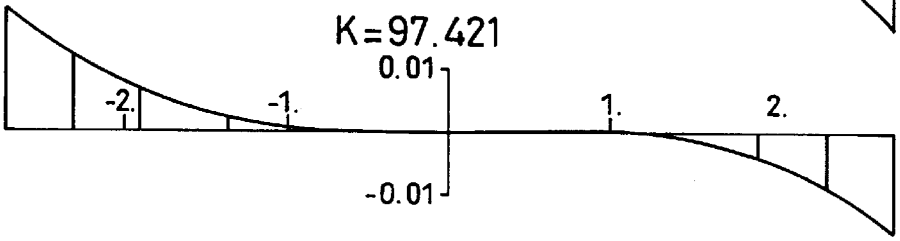
Figure 8E:
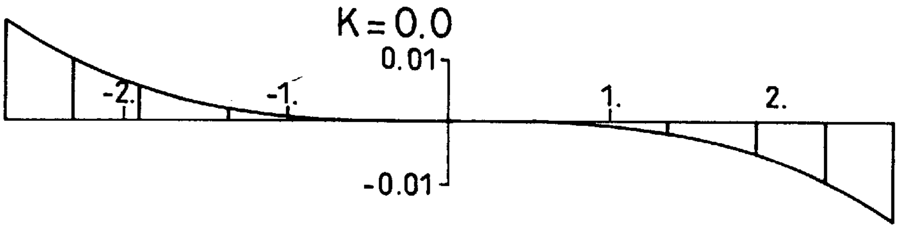
Figure 9:
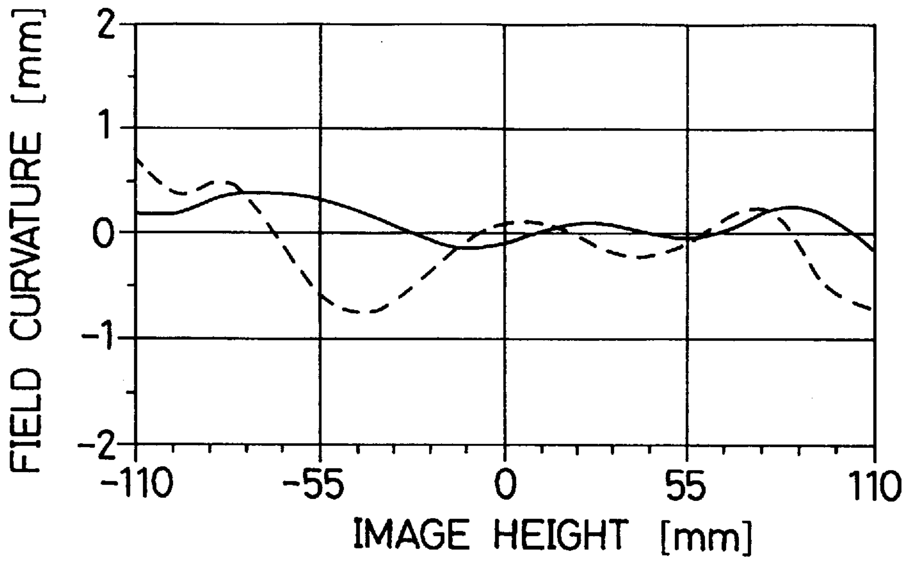
FIG. 9 is a graphic representation of field curvature of the second embodiment.
Figure 10:
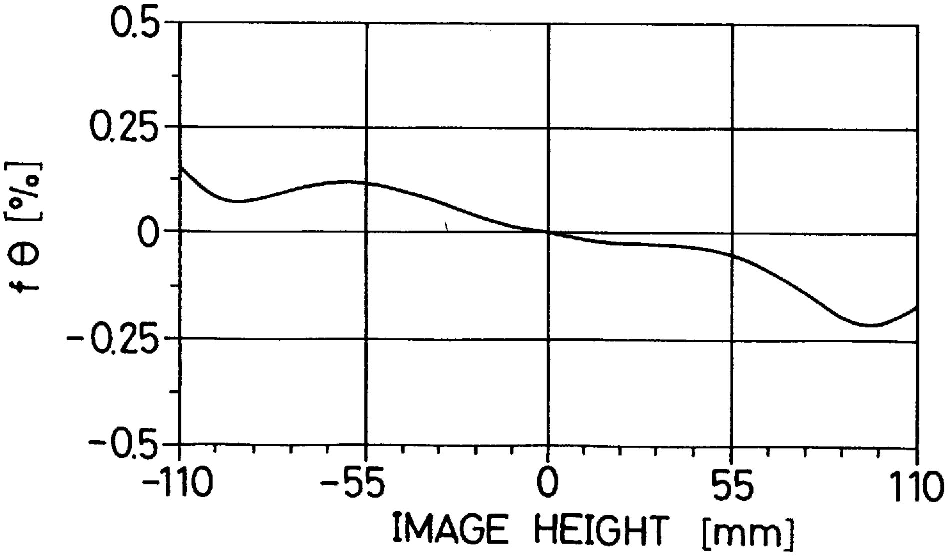
FIG. 10 is a graphic representation of the fθ property of the second embodiment.
Figure 11:
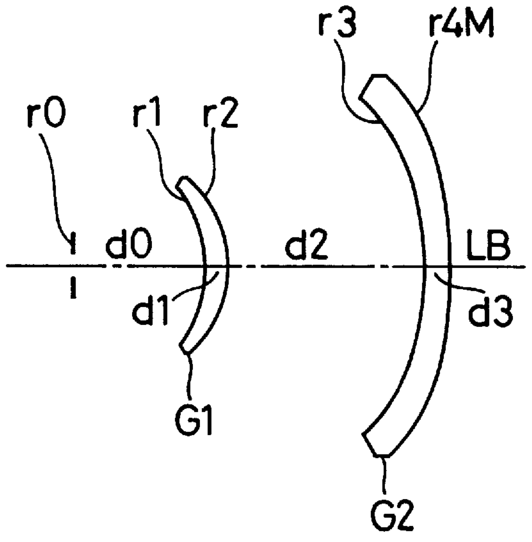
FIG. 11 is a main scanning direction cross-sectional view showing the lens arrangement of a third embodiment of the present invention.
Figure 12A:
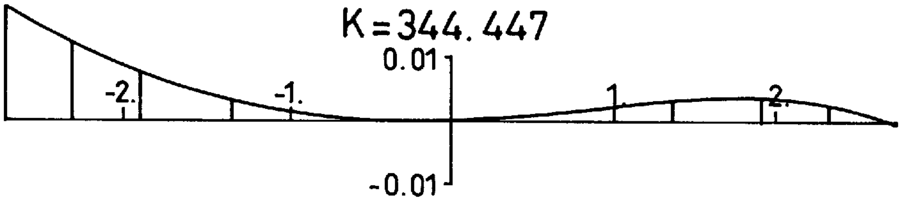
FIGS. 12A to 12E are graphic representations of lateral aberration of the third embodiment.
Figure 12B:
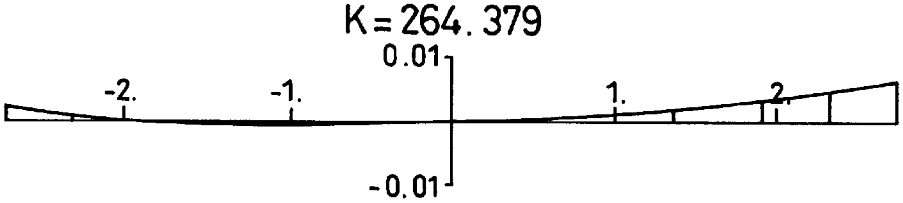
Figure 12C:
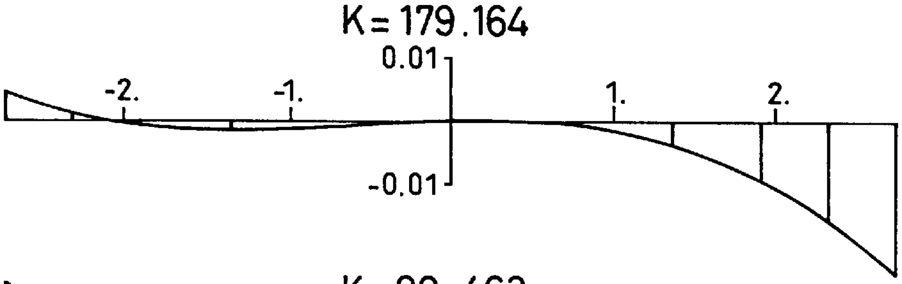
Figure 12D:
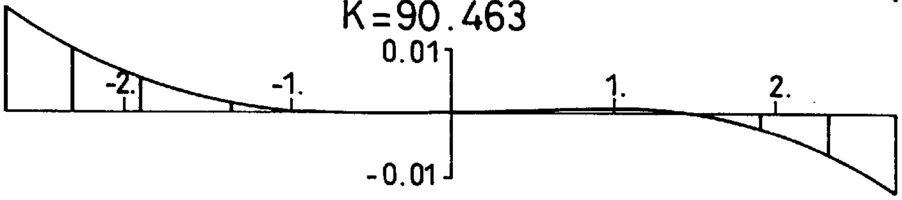
Figure 12E:
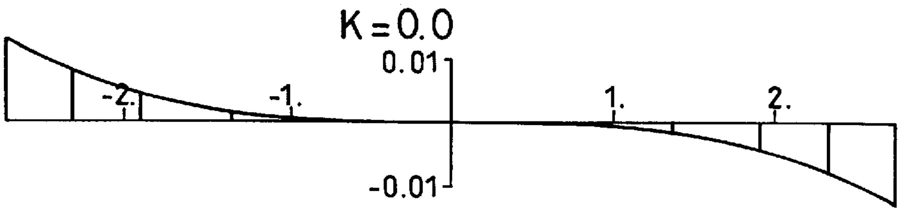
Figure 13:
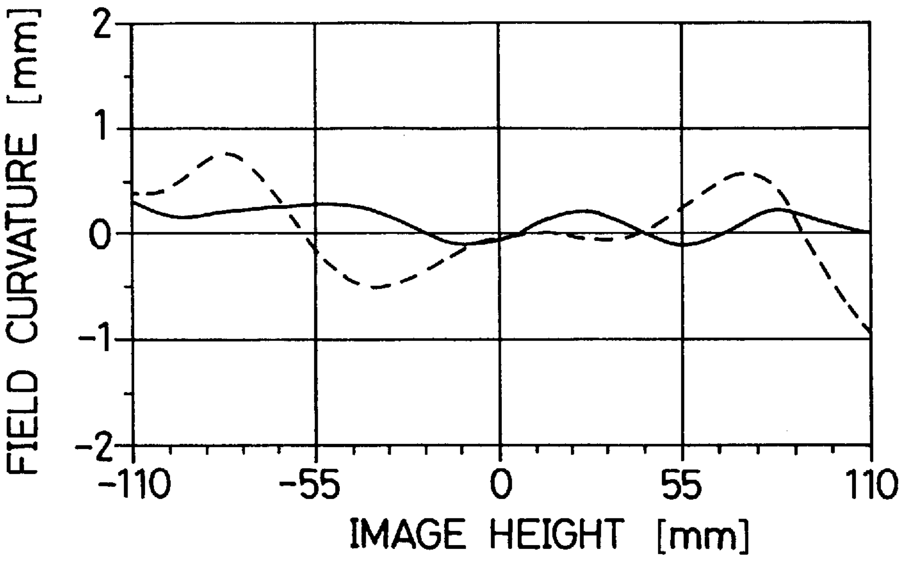
FIG. 13 is a graphic representation of field curvature of the third embodiment.
Figure 14:
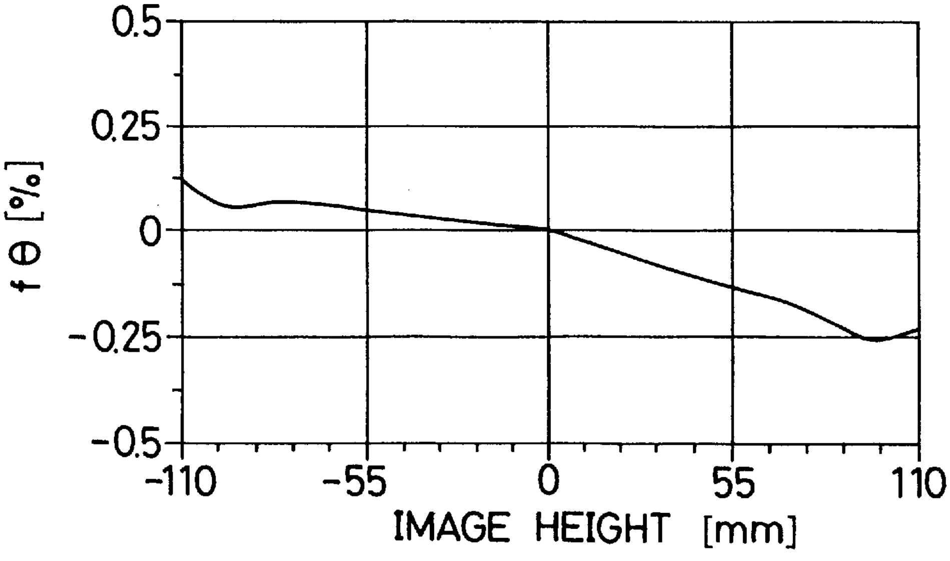
FIG. 14 is a graphic representation of the fθ property of the third embodiment.
Figure 15:
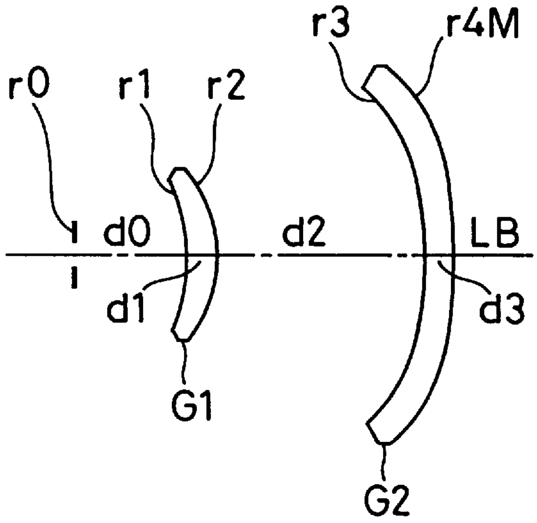
FIG. 15 is a main scanning direction cross-sectional view showing the lens arrangement of a fourth embodiment of the present invention.
Figure 16A:
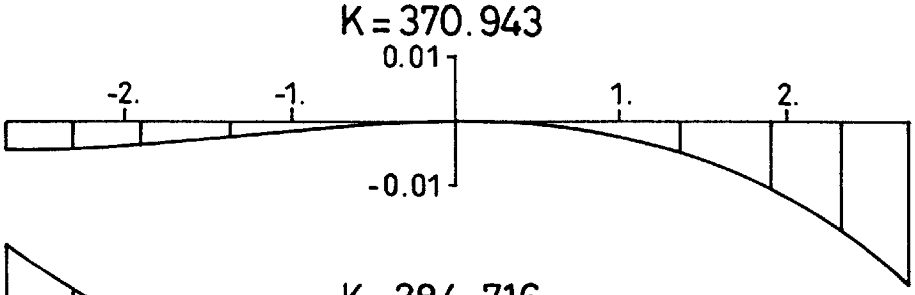
FIGS. 16A to 16E are graphic representations of lateral aberration of the fourth embodiment.
Figure 16B:
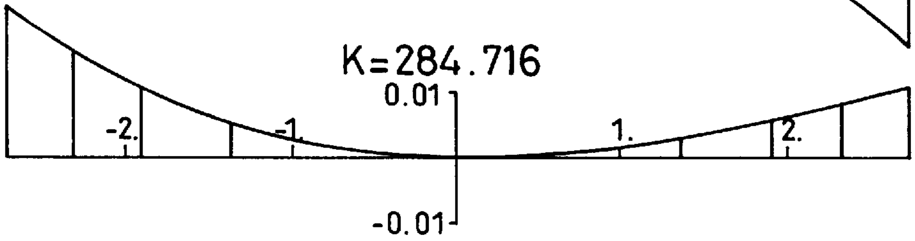
Figure 16C:
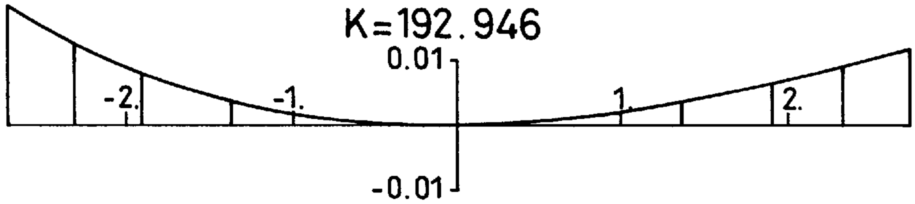
Figure 16D:
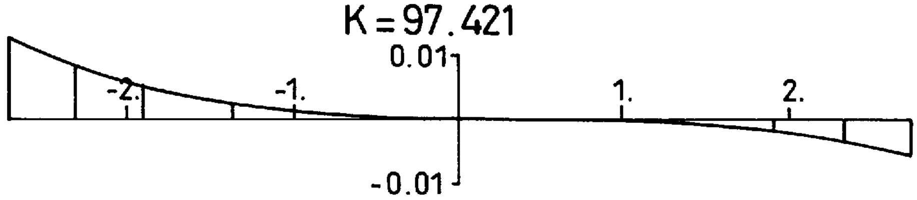
Figure 16E:
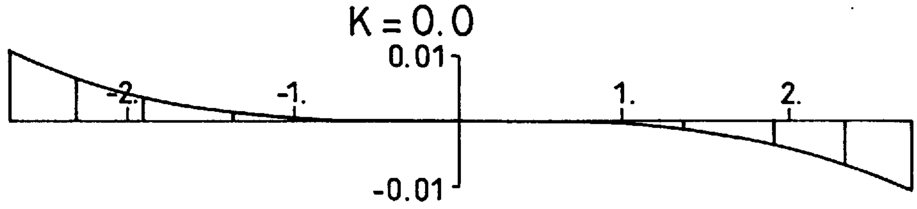
Figure 17:
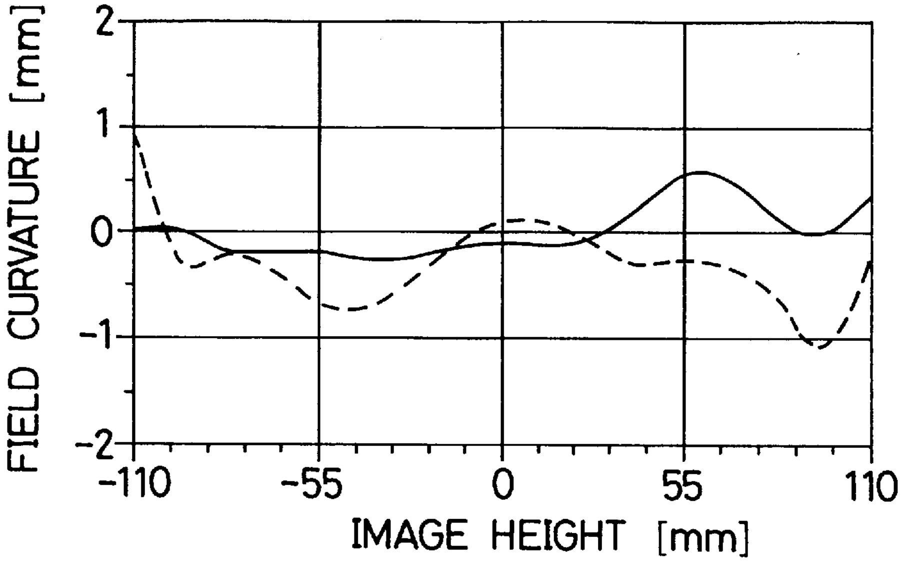
FIG. 17 is a graphic representation of field curvature of the fourth embodiment.
Figure 18:
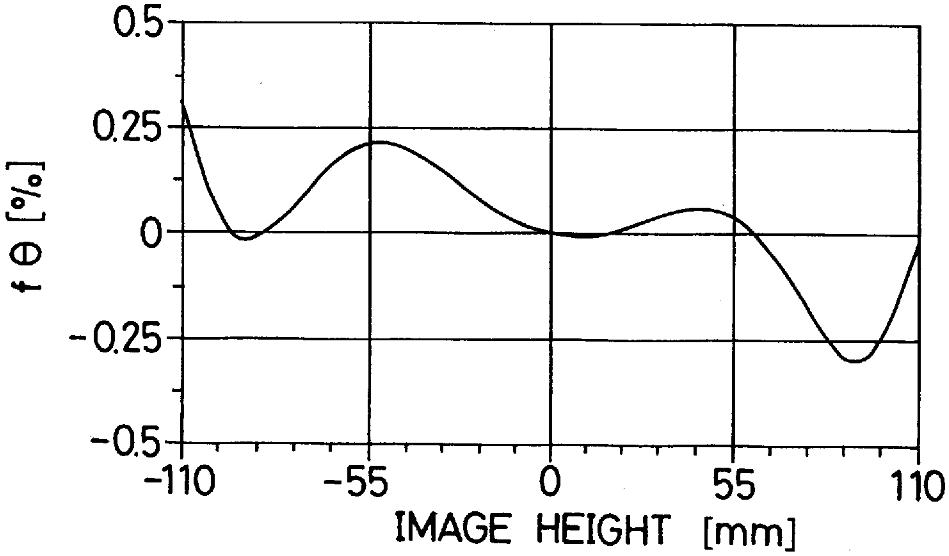
FIG. 18 is a graphic representation of the fθ property of the fourth embodiment.
Figure 19:
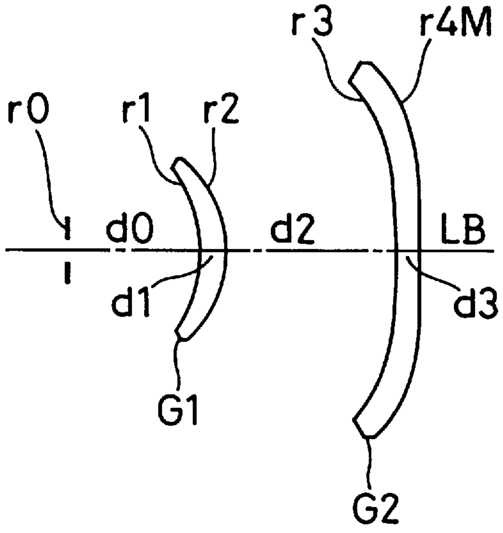
FIG. 19 is a main scanning direction cross-sectional view showing the lens arrangement of a fifth embodiment of the present invention.
Figure 20A:
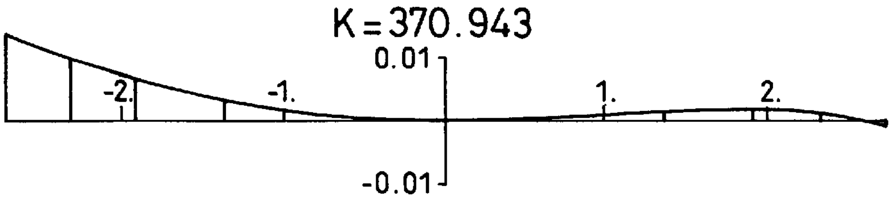
FIGS. 20A to 20E are graphic representations of lateral aberration of the fifth embodiment.
Figure 20B:
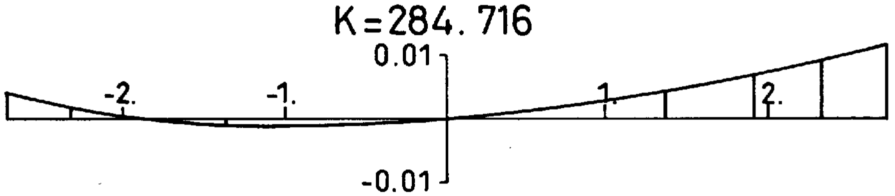
Figure 20C:
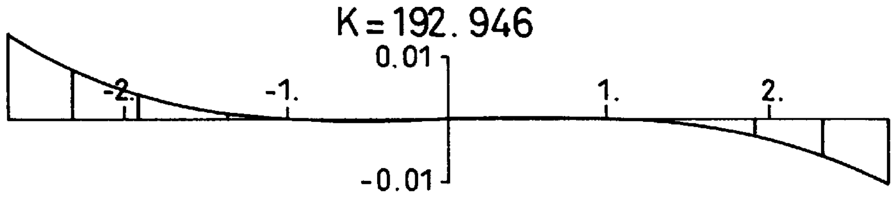
Figure 20D:
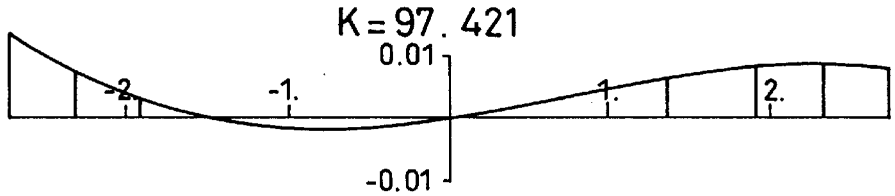
Figure 20E:
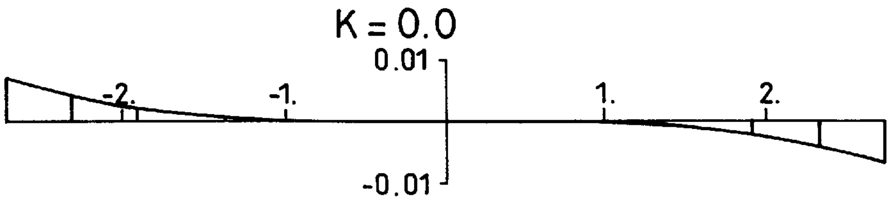
Figure 21:
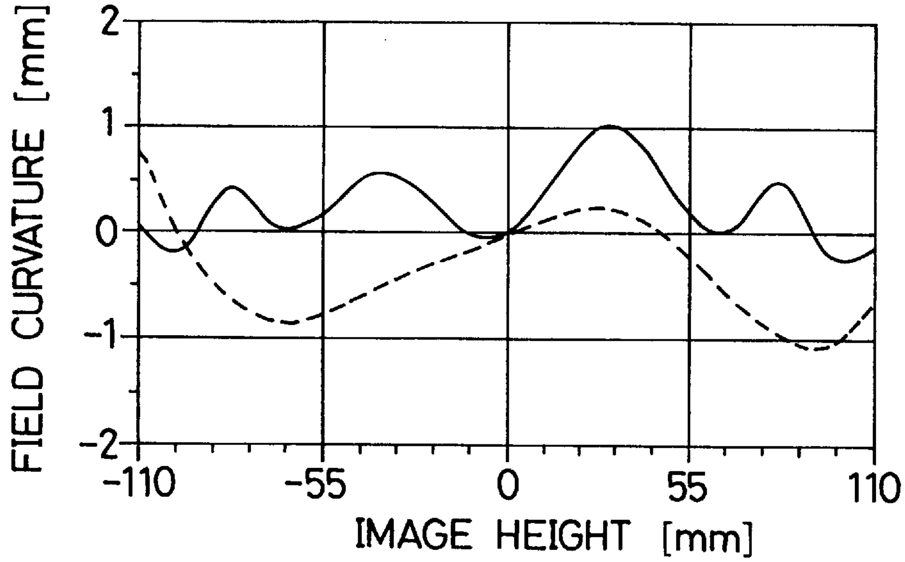
FIG. 21 is a graphic representation of field curvature of the fifth embodiment.
Figure 22:
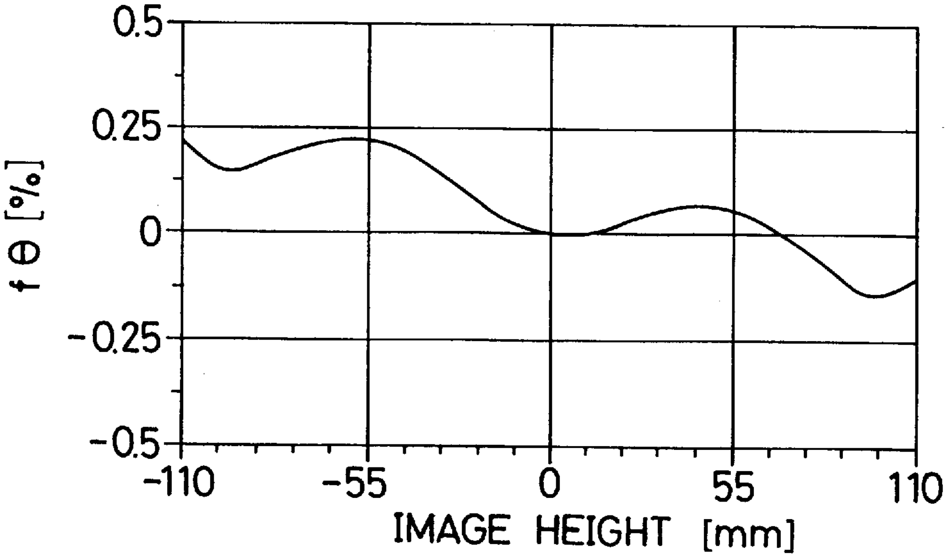
FIG. 22 is a graphic representation of the fθ property of the fifth embodiment.
Figure 23:
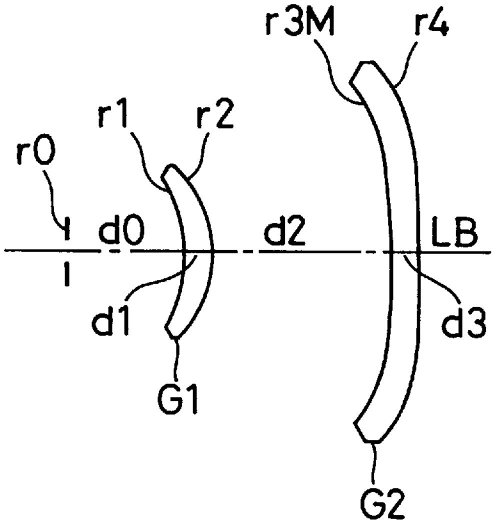
FIG. 23 is a main scanning direction cross-sectional view showing the lens arrangement of a sixth embodiment of the present invention.
Figure 24A:
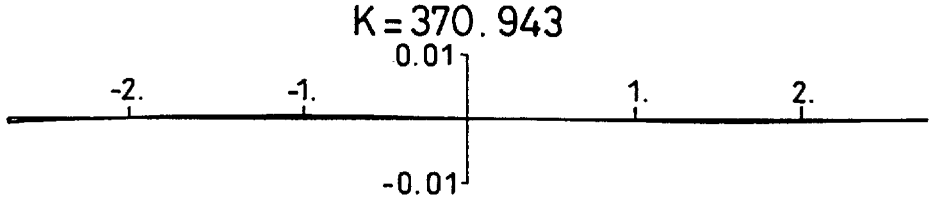
FIGS. 24A to 24E are graphic representations of lateral aberration of the sixth embodiment.
Figure 24B:
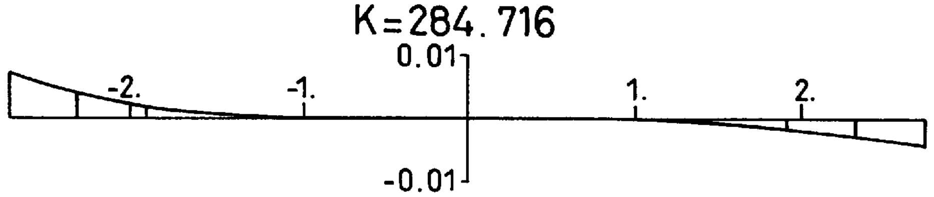
Figure 24C:
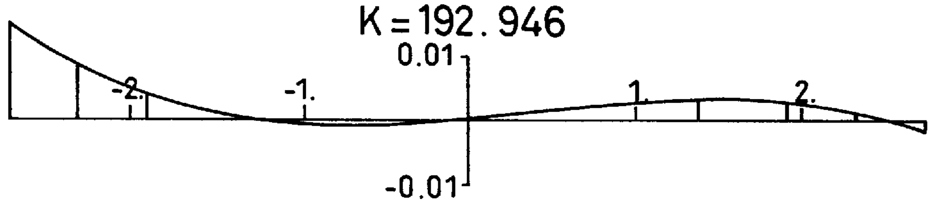
Figure 24D:
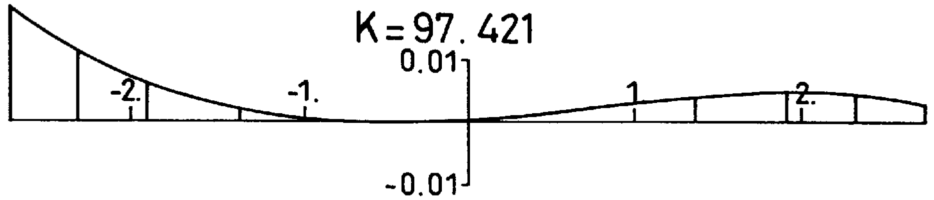
Figure 24E:
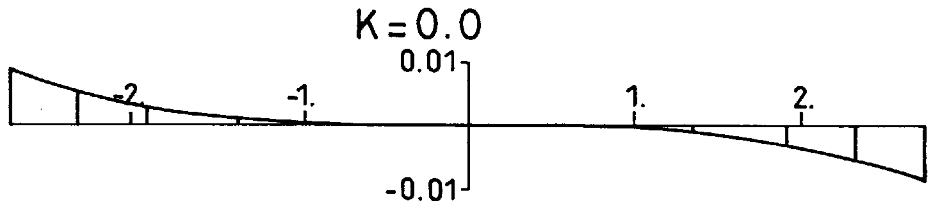
Figure 25:
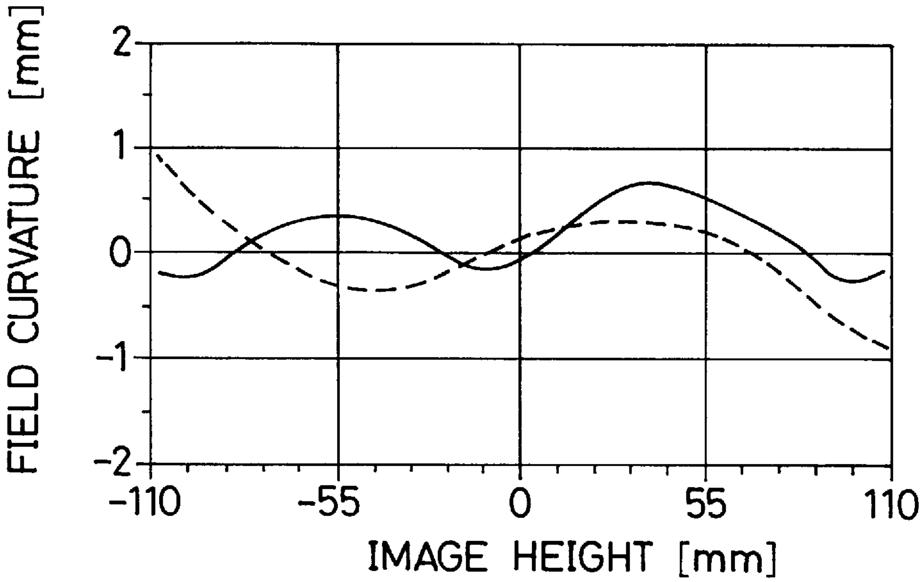
FIG. 25 is a graphic representation of field curvature of the sixth embodiment.
Figure 26:
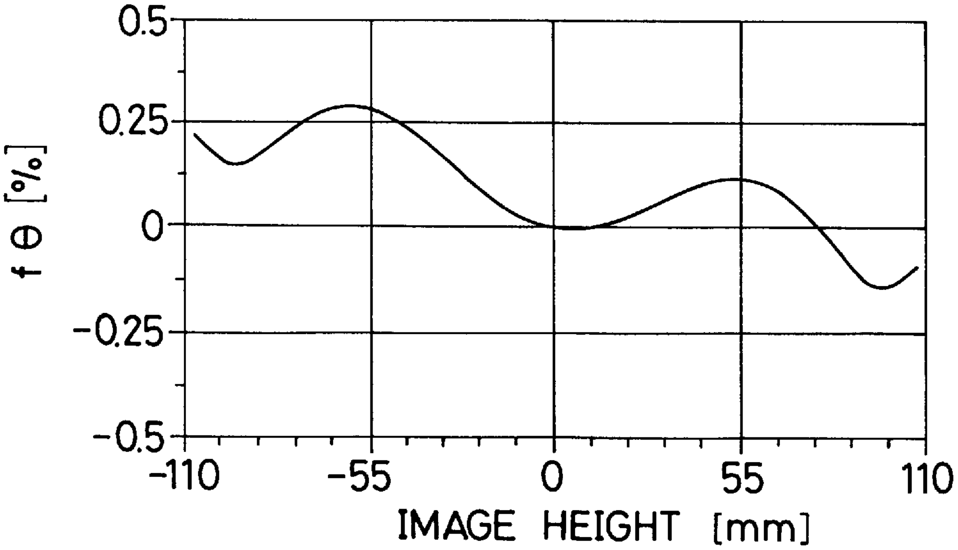
FIG. 26 is a graphic representation of the fθ property of the sixth embodiment.

FIGS. 1 and 2 show the general structure of the scanning optical system embodying the present invention with respect to the cross section in the main scanning direction (FIG. 1) and the cross section in the sub scanning direction (FIG. 2). The scanning optical system is provided with a deflector 5 and a scanning lens SL which images a convergent light beam LR deflected by the deflector 5 at a constant angular speed and scans a scanned surface 8 substantially at a constant speed.

In the scanning optical system, a divergent light beam emitted from a light source 1 comprising a semiconductor laser is converted into the convergent light beam LR in the main scanning direction (y direction) by a condenser lens 2. When no scanning lens SL is provided, the convergent light beam LR is imaged at the point of natural convergence (not shown). The convergent light beam LR has its luminous flux width limited by an aperture stop 3 so as to have a desired beam diameter and is incident on a cylindrical lens 4 having refractive power only on the sub scanning direction (z direction). The luminous flux having exited from the cylindrical lens 4 is incident on a polygonal mirror 5. Then, the luminous flux is imaged at the position of a deflective reflection surface 9*a* only with respect to the sub scanning direction as shown in FIG. 2 and is reflected at the point of deflection 9*b* as a linear luminous flux which is long in the main scanning direction.

The convergent light beam LR deflected for the constant angular speed scanning by the polygonal mirror which rotates at a high speed (about an axis of rotation 5x parallel to the sub scanning direction) is incident on the scanning lens SL. The scanning lens SL, which is processed by resin molding, should have a configuration that is easy to mold. The convergent light beam LR is condensed by the scanning lens SL into a uniform luminous flux having excellent fθ property, image plane property and coma on the scanned surface (image plane) 8 such as a photoreceptor so as to scan the scanned surface 8 substantially at a constant speed.

When the maximum angle of deflection $\theta_{max}$ is 32° like the first to sixth embodiments, the polygonal mirror 5 is small sized such that the diameter of its inscribed circle is approximately 30 mm, and has six mirror surfaces. Therefore, with the polygonal mirror 5, a high-definition output is obtained while the number of rotations of the motor and the output speed take adequate values. For example, when the maximum angle of deflection is 40°, the effective area on the deflective reflection surface 5*a* is insufficient for a polygonal mirror 5 of this size. This necessitates increasing the diameter of the inscribed circle. If the same output speed is obtained by reducing the number of mirror surfaces by four or five in order to increase the effective area, it is necessary to increase the number of rotations of the motor according to the reduction in the number of mirror surfaces.

Since the luminous flux is condensed at the position of deflection 9*b* as is apparent from the sub scanning direction cross-sectional view shown in FIG. 2, the deflective reflection surface 9*a* is substantially in a conjugate relation with a scanned surface on the scanned surface 8. This is in order to correct the shift of the position of convergence on the scanned surface 8 in the sub scanning direction when a slight surface inclination occurs in the polygonal mirror 5.

FIGS. 3, 7, 11, 15, 19 and 23 are cross-sectional views showing the lens arrangements of the scanning lenses SL of the first to sixth embodiments with respect to the main scanning direction. FIGS. 4A to 4E, 8A to 8E, 12A to 12E, 16A to 16E, 20A to 20E and 24A to 24E show lateral aberration curves of the first to sixth embodiments. These figures show the amounts of aberrations, on the image plane, of a luminous flux of an angle of view (angle of deflection) expressed by S1×sinθ=K. For example, FIGS. 4A to 4E showing the amount of coma of the first embodiment shows the generation of coma, on the image plane, of luminous fluxes of angles of view where K=0.0, 97.421, 192.946, 284.716 and 370.943. FIGS. 5, 9, 13, 17, 21 and 25 show field curvature of the first to sixth embodiments. The solid line DT represents the amount of field curvature in the main scanning direction. The broken line DS represents the amount of field curvature in the sub scanning direction. FIGS. 6, 10, 14, 18, 22 and 26 show distortion (i.e. fθ property) of the first to sixth embodiments.

Subsequently, characteristics of the scanning lens SL will be described. At the cross section in the main scanning direction, a first lens element G1 has a positive paraxial refractive power and a second lens element G2 has a negative paraxial refractive power, and the convergent light beam LR is incident. By these matters, the main scanning direction optical properties are satisfied. At the cross section in the sub scanning direction, the first lens G1 is a rotationally symmetrical lens, and the second lens element G2 includes at least one extended toric surface. By these matters, the optical properties are satisfied like in the main scanning direction.

The scanning lens SL is made of a resin and processed by injection molding. Since resin-made lenses are advantageous in mass production and cost, the embodiments satisfy the properties with the refractive index of the lens being 1.6 or lower. The first lens G1 includes at least one spherical surface which is advantageous because of the easiness of mold processing and inspections after molding, and has its first and second surfaces formed to be rotationally symmetrical. Additionally, it is advantageous over bi-convex and bi-concave lens elements in view of moldability that both the first and second lens elements G1 and G2 have their main scanning direction paraxial cross sections formed to be of meniscus configurations concave to the deflector side.

Thus, in the scanning optical system embodying the present invention, the generation of jitter due to variation in the axis-to-surface distance of the polygonal mirror 5 is curbed, and the sizes of the scanning lens and the polygonal mirror and the distance from the deflector to the image plane are reduced while the optical properties are maintained. As a result, the scanning optical system may be incorporated in an apparatus such as a laser printer as a small-size and high-definition scanning optical system.

As described above, according to the present invention, a small-size and high-definition scanning optical system is realized.

Obviously, many modifications and variations of the present invention are possible in light of the above teachings. It is therefore to be understood that within the scope of the appended claims, the invention may be practiced other than as specifically described.

TABLE 2

(1st Embodiment)

Construction Data

| | Radius of Curvature | Axial Distance | | Refractive Index (λ = 780 nm) |
|---|---|---|---|---|
| r0 | ∞ (Deflective surface) | | | |
| | | d0 | 26.5 | |
| *r1 | −34.299 | | | |
| | | d1 | 6.4 | N1 1.5188 |
| r2 | −26.782 | | | |
| | | d2 | 41.0 | |
| *r3 | −250.52 | | | |

TABLE 2-continued (1st Embodiment)

| | | | | |
|---|---|---|---|---|
| | | d3 | 6.4 | N2 1.5188 |
| r4M | −7686.4 | | | |
| *r4S | −25.642 | LB | 142.82 | |

Aspherical Coefficients

| | |
|---|---|
| r1 :ε = 1 | r3 : = 1 |
| A4 = $-0.41506 \times 10^{-5}$ | A4 = $-0.22418 \times 10^{-5}$ |
| A6 = $0.18915 \times 10^{-8}$ | A6 = $-0.70400 \times 10^{-9}$ |
| A8 = $-0.11239 \times 10^{-10}$ | A8 = $0.14436 \times 10^{-12}$ |
| A10 = $-0.53050 \times 10^{-14}$ | A10 = $0.93772 \times 10^{-17}$ |
| r4M :μ = 1 | r4S : ε = 1 |
| $a_{0,4} =$ $-0.27997 \times 10^{-5}$ | $a_{2,2} =$ $-0.154 \times 10^{-5}$ |
| $a_{0,6} =$ $-0.15622 \times 10^{-9}$ | $a_{2,4} =$ $-0.35 \times 10^{-8}$ |
| $a_{0,8} =$ $0.76038 \times 10^{-13}$ | $a_{2,6} =$ $0.7 \times 10^{-12}$ |
| $a_{0,10} =$ $-0.29875 \times 10^{-16}$ | $a_{2,8} =$ $-0.321 \times 10^{-15}$ |

TABLE 2

(2nd Embodiment)

Construction Data

| | Radius of Curvature | Axial Distance | | Refractive Index (λ = 780 nm) |
|---|---|---|---|---|
| r0 | ∞ (Deflective surface) | | | |
| | | d0 | 27.58 | |
| *r1 | −34.210 | | | |
| | | d1 | 5.61 | N1 1.5722 |
| r2 | −26.079 | | | |
| | | d2 | 44.97 | |
| *r3 | −80.840 | | | |
| | | d3 | 6.36 | N2 1.5722 |
| r4M | −168.01 | | | |
| r4S | −23.24 | LB | 130 | |

Aspherical Coefficient

| | |
|---|---|
| r1 :ε = 1 | r3 :ε = 1 |
| A4 = $-0.39034 \times 10^{-5}$ | A4 = $-0.15872 \times 10^{-5}$ |
| A6 = $0.14170 \times 10^{-8}$ | A6 = $-0.76369 \times 10^{-9}$ |
| A8 = $-0.11127 \times 10^{-10}$ | A8 = $0.14316 \times 10^{-12}$ |
| A10 = $-0.53049 \times 10^{14}$ | A10 = $0.15852 \times 10^{16}$ |
| r4M :μ = 1 | r4S : ε = 1 |
| $a_{0,4} =$ $-0.21582 \times 10^{-5}$ | $a_{2,2} =$ $0.95 \times 10^{-6}$ |
| $a_{0,6} =$ $-0.17564 \times 10^{-9}$ | $a_{2,4} =$ $-0.19 \times 10^{-8}$ |
| $a_{0,8} =$ $0.73317 \times 10^{-13}$ | $a_{2,6} =$ $-0.116 \times 10^{-12}$ |
| $a_{0,10} =$ $-0.26331 \times 10^{-16}$ | |

TABLE 3

(3rd Embodiment)

Construction Data

| | Radius of Curvature | Axial Distance | | Refractive Index (λ = 780 nm) |
|---|---|---|---|---|
| r0 | ∞ (Deflective surface) | | | |
| | | d0 | 29.89 | |
| *r1 | −33.784 | | | |
| | | d1 | 5.27 | N1 1.5722 |
| r2 | −25.998 | | | |
| | | d2 | 44.97 | |
| *r3 | −70.778 | | | |
| | | d3 | 5.85 | N2 1.5722 |
| r4M | −125.13 | | | |
| r4S | −22.68 | LB | 130 | |

TABLE 3-continued (3rd Embodiment)

Aspherical Coefficients

| | | | |
|---|---|---|---|
| r1 :ε = | 1 | r3 :ε = | 1 |
| A4 = | $-0.40827 \times 10^{-5}$ | A4 = | $-0.78323 \times 10^{-6}$ |
| A6 = | $0.10860 \times 10^{-8}$ | A6 = | $-0.77319 \times 10^{-9}$ |
| A8 = | $-0.11186 \times 10^{-10}$ | A8 = | $0.14003 \times 10^{-12}$ |
| A10 = | $-0.53049 \times 10^{-14}$ | A10 = | $0.14626 \times 10^{-16}$ |
| r4M :μ = | 1 | r4S :ε = | 1 |
| $a_{0,4}$ = | $-0.15486 \times 10^{-5}$ | $a_{2,2}$ = | $0.27 \times 10^{-5}$ |
| $a_{0,6}$ = | $-0.29495 \times 10^{-9}$ | $a_{2,4}$ = | $-0.16 \times 10^{-8}$ |
| $a_{0,8}$ = | $0.72045 \times 10^{13}$ | $a_{2,6}$ = | $0.31 \times 10^{-13}$ |
| $a_{0,10}$ = | $-0.23475 \times 10^{16}$ | | |

TABLE 4

(4th Embodiment)

Construction Data

| | Radius of Curvature | | Axial Distance | Refractive Index (λ = 780 nm) |
|---|---|---|---|---|
| r0 | ∞ (Deflective surface) | | | |
| | | d0 | 25.34 | |
| r1 | −42.041 | | | |
| | | d1 | 6.45 | N1 1.5188 |
| *r2 | −30.657 | | | |
| | | d2 | 47 | |
| *r3 | −92.083 | | | |
| | | d3 | 6.55 | N2 1.5188 |
| r4M | −147.35 | | | |
| r4S | −22.22 | LB | 135.14 | |

Aspherical Coefficients

| | | | |
|---|---|---|---|
| r2 :ε = | 1 | r3 :ε = | 1 |
| A4 = | $0.12928 \times 10^{-5}$ | A4 = | $-0.19432 \times 10^{-5}$ |
| A6 = | $0.21184 \times 10^{-8}$ | A6 = | $-0.66638 \times 10^{-9}$ |
| A8 = | $0.15732 \times 10^{-11}$ | A8 = | $0.13092 \times 10^{-12}$ |
| A10 = | $0.14288 \times 10^{-15}$ | A10 = | $0.25555 \times 10^{-19}$ |
| r4M :μ = | 1 | r4S : ε = | 1 |
| $a_{0,4}$ = | $-0.21514 \times 10^{-5}$ | $a_{2,2}$ = | $0.85 \times 10^{-6}$ |
| $a_{0,6}$ = | $-0.34677 \times 10^{-9}$ | $a_{2,4}$ = | $-0.18 \times 10^{-8}$ |
| $a_{0,8}$ = | $0.10046 \times 10^{-12}$ | $a_{2,6}$ = | $-0.37 \times 10^{-12}$ |
| $a_{0,10}$ = | $-0.33544 \times 10^{16}$ | | |

TABLE 5

(5th Embodiment)

Construction Data

| | Radius of Curvature | | Axial Distance | Refractive Index (λ = 780 nm) |
|---|---|---|---|---|
| r0 | ∞ (Deflective surface) | | | |
| | | d0 | 30 | |
| *r1 | −34.794 | | | |
| | | d1 | 6 | N1 1.5188 |
| r2 | −26.628 | | | |
| | | d2 | 39 | |
| *r3 | −178.34 | | | |
| | | d3 | 5.5 | N2 1.5188 |
| r4M | −837.13 | | | |
| r4S | −25.13 | LB | 142.2 | |

TABLE 5-continued (5th Embodiment)

Aspherical Coefficients

| | | | |
|---|---|---|---|
| r1 :ε = | 1 | r3 :ε = | 1 |
| A4 = | $-0.46370 \times 10^{-5}$ | A4 = | $-0.21702 \times 10^{-5}$ |
| A6 = | $0.18991 \times 10^{-8}$ | A6 = | $-0.61552 \times 10^{-9}$ |
| A8 = | $-0.11242 \times 10^{-10}$ | A8 = | $0.92192 \times 10^{-13}$ |
| A10 = | $-0.53051 \times 10^{-14}$ | A10 = | $0.60082 \times 10^{-17}$ |
| r4M :μ = | 1 | r4S : ε = | 1 |
| $a_{0,4}$ = | $-0.28947 \times 10^{-5}$ | $a_{2,2}$ = | $-0.154 \times 10^{-5}$ |
| $a_{0,6}$ = | $-0.73510 \times 10^{-10}$ | $a_{2,4}$ = | $-0.35 \times 10^{-0.8}$ |
| $a_{0,8}$ = | $0.47056 \times 10^{-13}$ | $a_{2,6}$ = | $0.88 \times 10^{-12}$ |
| $a_{0,10}$ = | $-0.40241 \times 10^{-16}$ | $a_{2,8}$ = | $-0.5 \times 10^{15}$ |

TABLE 6

(6th Embodiment)

Construction Data

| | Radius of Curvature | | Axial Distance | Refractive Index (λ = 780 nm) |
|---|---|---|---|---|
| r0 | ∞ (Deflective surface) | | | |
| | | d0 | 26.5 | |
| *r1 | −34.299 | | | |
| | | d1 | 6.4 | N1 1.5188 |
| r2 | −26.782 | | | |
| | | d2 | 41.0 | |
| r3M | −250.52 | | | |
| r3S | 27.78 | | | |
| | | d3 | 6.4 | N2 1.5188 |
| *r4 | −7686.4 | | | |
| | | LB | 142.82 | |

Aspherical Coefficients

| | | | |
|---|---|---|---|
| r1 :ε = | 1 | r4 :ε = | 1 |
| A4 = | $-0.41506 \times 10^{-5}$ | A4 = | $-0.27997 \times 10^{-5}$ |
| A6 = | $0.18915 \times 10^{-8}$ | A6 = | $-0.15622 \times 10^{-9}$ |
| A8 = | $-0.11239 \times 10^{-10}$ | A8 = | $0.76038 \times 10^{-13}$ |
| A10 = | $-0.53050 \times 10^{-14}$ | A10 = | $-0.29875 \times 10^{-16}$ |
| r3M :μ = | 1 | r3S : ε = | 1 |
| $a_{0,4}$ = | $-0.22418 \times 10^{-5}$ | $a_{2,2}$ = | $-0.56 \times 10^{-5}$ |
| $a_{0,6}$ = | $-0.70400 \times 10^{-9}$ | $a_{2,6}$ = | $0.17 \times 10^{-11}$ |
| $a_{0,8}$ = | $0.14436 \times 10^{-12}$ | $a_{2,8}$ = | $-0.325 \times 10^{-15}$ |
| $a_{0,10}$ = | $0.93772 \times 10^{-17}$ | | |

TABLE 7

| | 1st embodiment | 2nd embodiment | 3rd embodiment | 4th embodiment | 5th embodiment | 6th embodiment |
|---|---|---|---|---|---|---|
| $\theta_{max}$ | 32° | 32° | 32° | 32° | 32° | 32° |
| $Y_{max}$ | 110 | 110 | 110 | 110.5 | 110 | 110 |
| S1 | 700 | 700 | 650 | 700 | 700 | 700 |
| β | 0.281 | 0.281 | 0.303 | 0.281 | 0.281 | 0.281 |
| C | 80.3 | 84.52 | 85.98 | 85.36 | 80.5 | 80.3 |
| L | 223.17 | 214.52 | 215.98 | 220.49 | 223.37 | 223.17 |
| $f_1$ | 182.53 | 153.25 | 158.15 | 182.84 | 174.81 | 182.53 |
| $f_2$ | −499.28 | −279.71 | −296.38 | −493.18 | −438.03 | −499.28 |
| f | 263.42 | 270.55 | 277.08 | 265 | 263.19 | 263.42 |
| W | 220 | 220 | 220 | 220.3 | 220 | 220 |
| $f_1/f_2$ | −0.365 | −0.548 | −0.534 | −0.371 | −0.399 | −0.365 |
| W/L | 1.014 | 0.975 | 0.982 | 1.0 | 1.015 | 1.014 |
| C/L | 0.36 | 0.394 | 0.398 | 0.387 | 0.36 | 0.36 |

What is claimed is:

1. A scanning optical system comprising:

a deflector which deflects a luminous flux at a constant angular speed, and a scanning lens which images the luminous flux deflected by the deflector on a surface to be scanned and causes the luminous flux to scan the surface in a main scanning direction substantially at a constant speed, wherein a convergent light beam is incident on the scanning lens, and wherein said scanning lens includes from a deflector side a first lens element whose paraxial refractive power in the main scanning direction is positive and a second lens element whose paraxial refractive power in the main scanning direction is negative, wherein the following condition is fulfilled:

$\beta>0$ where β represents the magnification of the scanning lens in the main scanning direction.

2. A scanning optical system as claimed in claim 1, wherein said first and second lens elements both have their paraxial cross sections in the main scanning direction formed to be of meniscus configurations concave to the deflector side.

3. A scanning optical system as claimed in claim 1, wherein the following condition is fulfilled:

$0<\beta<0.4$ where β is a magnification of the scanning lens in the main scanning direction.

4. A scanning optical system as claimed in claim 1, wherein the following condition is fulfilled:

$f_1>0$ and $f_2<0$ where $f_1$ is a paraxial focal length of the first lens element at a cross section in the main scanning direction, and $f_2$ is a paraxial focal length of the second lens element at the cross section in the main scanning direction.

5. A scanning optical system as claimed in claim 4, wherein the following condition is fulfilled:

$$-0.7<\frac{f_1}{f_2}<-0.3.$$

6. A scanning optical system as claimed in claim 1, wherein the following condition is fulfilled:

$$0.25<\frac{C}{L}<0.5$$

where L is a distance from a point of deflection to an image plane, and C is a distance from the point of deflection to an image side surface of the second lens element.

7. A scanning optical system as claimed in claim 1, wherein the following condition is fulfilled:

$$0.8<\frac{W}{L}<1.2$$

where W is a width of scanning on an image plane, and L is a distance from a point of deflection to an image plane.

8. A scanning optical system comprising:

a light source which emits a divergent light beam;

a condenser lens which converts a luminous flux emitted from the light source into a convergent light beam with respect to a main scanning direction;

a deflector which reflects the convergent light beam having exited from the condenser lens at a constant angular speed; and a scanning lens which images the convergent light beam deflected by the deflector on a surface to be scanned and causes the light beam to scan the surface in the main scanning direction substantially at a constant speed, said scanning lens including from a deflector side a first lens element whose paraxial refractive power in the main scanning direction is positive and a second lens element whose paraxial refractive power in the main scanning direction is negatives, wherein the following condition is fulfilled:

$\beta>0$ where β represents the magnification of the scanning lens in the main scanning direction.

9. A scanning optical system as claimed in claim 8, further comprising a cylindrical lens which images the luminous flux incident on the deflector in a vicinity of a point of deflection of the deflector with respect to a sub scanning direction.

10. A scanning optical system as claimed in claim 9, wherein said scanning lens includes a toric surface such that a paraxial refractive power in the main scanning direction and a paraxial refractive power in the sub scanning direction are different from each other.

11. A scanning optical system as claimed in claim 10, wherein an extended toric surface is formed in the second lens element.

12. A scanning optical system as claimed in claim 11, wherein said first lens element is rotationally symmetrical.

13. A scanning optical system as claimed in claim 11, wherein the following condition is fulfilled:

$$-0.7 < \frac{f_1}{f_2} < -0.3$$

where $f_1$ is a paraxial focal length of the first lens element at a cross section in the main scanning direction, and $f_2$ is a paraxial focal length of the second lens element at a cross section in the main scanning direction.

14. A scanning optical system as claimed in claim 8, wherein said first and second lens elements both have their paraxial cross sections in the main scanning direction formed to be of meniscus configurations concave to the deflector side.

15. A scanning optical system as claimed in claim 8, wherein the following condition is fulfilled:

$0<\beta<0.4$ where $\beta$ is a magnification of the scanning lens in the main scanning direction.

16. A scanning optical system as claimed in claim 8, wherein the following condition is fulfilled:

$f_1>0$ and $f_2<0$ where $f_1$ is a paraxial focal length of the first lens element at a cross section in the main scanning direction, and $f_2$ is a paraxial focal length of the second lens element at the cross section in the main scanning direction.

17. A scanning optical system as claimed in claim 8, wherein the following condition is fulfilled:

$$0.25 < \frac{C}{L} < 0.5$$

where L is a distance from a point of deflection to an image plane, and C a distance from the point of deflection to an image side surface of the second lens element.

18. A scanning optical system as claimed in claim 8, wherein the following condition is fulfilled:

$$0.8 < \frac{W}{L} < 1.2$$

where W is a width of scanning on an image plane, and L is a distance from a point of deflection to an image plane.

19. A scanning optical system as claimed in claim 8, wherein the following condition is fulfilled:

S1>L where S1 represents a distance from a deflection point to an object point on which the convergent light would converge but for the scanning line, and L represents a distance from the deflection point to an image point.

20. A scanning lens which images a convergent luminous flux deflected by a deflector on a surface to be scanned and causes the luminous flux to scan the surface in a main scanning direction substantially at a constant speed in a scanning optical system, said scanning lens consisting of from a deflector side:

- a first lens element whose paraxial refractive power in the main scanning direction is positive; and
- a second lens element whose paraxial refractive power in the main scanning direction is negative, wherein the following condition is fulfilled:

$\beta>0$ where $\beta$ represents the magnification of the scanning lens in the main scanning direction.

21. A scanning lens as claimed in claim 20, wherein said first and second lens elements both have their paraxial cross sections in the main scanning direction formed to be of meniscus configurations concave to a same side.

22. A scanning lens as claimed in claim 20, wherein the following condition is fulfilled:

$0<\beta<0.4$ where $\beta$ is a magnification of the scanning lens in the main scanning direction.

23. A scanning lens as claimed in claim 20, wherein the following condition is fulfilled:

$f_1>0$ and $f_2<0$ where $f_1$ is a paraxial focal length of the first lens element at a cross section in the main scanning direction, and $f_2$ is a paraxial focal length of the second lens element at the cross section in the main scanning direction.

24. A scanning lens as claimed in claim 23, wherein the following condition is fulfilled:

$$-0.7 < \frac{f_1}{f_2} < -0.3.$$

25. A scanning lens as claimed in claim 20, wherein the following condition is fulfilled:

S1>L where S1 represents a distance from a deflection point to an object point on which the convergent light would converge but for the scanning line, and L represents a distance from the deflection point to an image point.

26. A scanning optical system for applying a source of light, comprising:

- a deflector;
- means for converging a light beam from a source of light and applying the convergent light beam to the deflector; and
- a scanning lens system for imaging the convergent light beam from the deflector on a surface, including a first lens element whose parallel refractive power in the main scanning direction is positive and a second lens element whose paraxial refractive power in the main scanning direction is negative, wherein the following condition is fulfilled:

$0<\beta0<0.4$ where $\beta$ is a magnification of the scanning lens system in the main scanning direction.

27. A scanning optical system as claimed in claim 26, wherein aid first and second lens elements both have their paraxial cross sections in the main scanning direction formed to be of meniscus configurations concave to the deflector side.

28. A scanning optical system for applying a source of light, comprising:

- a deflector;
- means for converging a light beam from a source of light and applying the convergent light beam to the deflector; and
- a scanning lens system for imaging the convergent light beam from the deflector on a surface, including a first lens element whose parallel refractive power in the main scanning direction is positive and a second lens element whose paraxial refractive power in the main scanning direction is negative, wherein the following condition is fulfilled:

$$0.25 < \frac{C}{L} < 0.5$$

where L is a distance from a point of deflection to an image plane, and C is a distance from the point of deflection to an image side surface of the second lens element.

29. A scanning optical system for applying a source of light, comprising:

a deflector;

means for converging a light beam from a source of light and applying the convergent light beam to the deflector; and a plastic scanning lens system for imaging the convergent light beam from the deflector on a surface, including a first lens element whose parallel refractive power in the main scanning direction is positive and a second lens element whose paraxial refractive power in the main scanning direction is negative, and a surface of the second lens element has a toric shape.

30. A scanning optical system as claimed in claim 29 wherein the first lens element has surfaces that are rotationally symmetrical.

31. A scanning optical system as claimed in claim 29 wherein said first and second lens elements both have their paraxial cross sections in the main scanning direction formed to be meniscus configurations concave to the deflector side.

32. A scanning optical system comprising:

a deflector which deflects a luminous flux at a constant angular speed, and a scanning lens which images the luminous flux deflected by the deflector on a surface to be scanned and causes the luminous flux to scan the surface in a main scanning direction substantially at a constant speed, wherein a convergent light beam is incident on the scanning lens, and wherein said scanning lens includes from a deflector side a first lens element whose paraxial refractive power in the main scanning direction is positive and a second lens element whose paraxial refractive power in the main scanning direction is negative, wherein the following condition is fulfilled:

$S1>L$ where S1 represents a distance from a deflection point to an object point on which the convergent light would converge but for the scanning line, and L represents a distance from the deflection point to an image point.

33. A scanning optical system as claimed in claim 32, wherein the following condition is fulfilled:

$f_1>0$ and $f_2<0$ where $f_1$ is a paraxial focal length of the first lens element at a cross section in the main scanning direction, and $f_2$ is a paraxial focal length of the second lens element at the cross section in the main scanning direction.

34. A scanning optical system as claimed in claim 33, wherein the following condition is fulfilled:

$$-0.7 < \frac{f_1}{f_2} < -0.3$$

where $f_1$ is a paraxial focal length of the first lens element at a cross section in the main scanning direction, and $f_2$ is a paraxial focal length of the second lens element at the cross section in the main scanning direction.

35. A scanning optical system comprising:

a deflector which deflects a luminous flux at a constant angular speed, and a scanning lens which images the luminous flux deflected by the deflector on a surface to be scanned and causes the luminous flux to scan the surface in a main scanning direction substantially at a constant speed, wherein a convergent light beam is incident on the scanning lens, and wherein said scanning lens includes from a deflector side a first lens element whose paraxial refractive power in the main scanning direction is positive and a second lens element whose paraxial refractive power in the main scanning direction is negative, wherein the following condition is fulfilled:

$$0.8 < \frac{W}{L} < 1.2$$

where W is a width of scanning on an image plane, and L is a distance from a point of deflection to an image plane.

36. A scanning optical system comprising:

a light source which emits a divergent light beam;

a condenser lens which converts a luminous flux emitted from the light source into a convergent light beam with respect to a main scanning direction;

a deflector which deflects the convergent light beam having exited from the condenser lens at a constant angular speed; and a scanning lens which images the convergent light beam deflected by the deflector on a surface to be scanned and causes the light beam to scan the surface in the main scanning direction substantially at a constant speed, said scanning lens including from a deflector side a first lens element whose paraxial refractive power in the main scanning direction is positive and a second lens element whose paraxial refractive power in the main scanning direction is negative, wherein the following condition is fulfilled:

$$-0.7 < \frac{f_1}{f_2} < -0.3$$

where $f_1$ is a paraxial focal length of the first lens element at a cross section in the main scanning direction, and $f_2$ is a paraxial focal length of the second lens element at a cross section in the main scanning direction.

* * * * *